Oct. 1, 1963     J. C. HAMAKER, JR     3,105,723

ANTI-FRICTION BEARINGS AND ALLOY STEELS USED THEREIN

Filed Feb. 17, 1961

*INVENTOR:*
JOHN C. HAMAKER, JR.
BY *Marshall Johnston Cook & Root*

ATT'YS ated Oct. 1, 1963

3,105,723
ANTI-FRICTION BEARINGS AND ALLOY STEELS USED THEREIN
John C. Hamaker, Jr., Latrobe, Pa., assignor to Vanadium-Alloys Steel Company, Latrobe, Pa., a corporation of Pennsylvania
Filed Feb. 17, 1961, Ser. No. 89,988
6 Claims. (Cl. 308—3)

This invention, in general, relates to alloy steel anti-friction bearings, and more particularly to anti-friction bearings whose bearing surfaces are composed of alloy steels having high wear resistance and corrosion resistance at high temperatures, as well as to alloy steels used therein.

Anti-friction bearings are made from a variety of different alloys. This invention is concerned primarily with the provision of alloy steels which have high wear-resistant and corrosion-resistant properties at elevated temperatures, e.g., at 500° F. and above. In many instances, bearings in hot working machines or apparatus must function in the presence of great quantities of heat given off by a machine or apparatus. The heat of the bearings can greatly reduce their operating life if they are not made from the proper wear-resistant and oxidation-resistant alloys.

It is an object of this invention to provide improvements in alloy steels and alloy steel anti-friction bearings for machines or apparatus wherein the bearings are heated to high temperatures.

Another object of the invention is to provide anti-friction bearings having improved heat resistance under high temperature usage.

Still another object of the invention is to provide anti-friction bearings having improved corrosion resistance under high temperature usage.

A further object is to provide alloy steels which are resistant to deterioration by heat and/or corrosion under high temperatures.

These and other objects of the invention are achieved by making at least one of the bearing surfaces of the anti-friction bearings, and preferably all of the bearing surfaces of anti-friction bearings, of an alloy steel of the composition:

| | Percent by weight |
|---|---|
| Carbon | 1.00–1.40 |
| Silicon | 0–3.00 |
| Manganese | 0–1.00 |
| Tungsten+2x Molybdenum | 13.00–18.00 |
| Chromium | 6.00–14.00 |
| Vanadium | 3.00–5.00 |
| Cobalt | 0.00–10.00 |
| Sulfur | 0–0.50 |
| Phosphorus | 0–0.50 |

The item of "Tungsten+2x Molybdenum" means the combined total of the weight percentage of tungsten and twice the weight of molybdenum. Covered within this range are tungsten and molybdenum combinations of 0–18% tungsten and 0–9% molybdenum where the combined weight percentages of tungsten plus twice the molybdenum fall within the range of 13.00 to 18.00%. With no molybdenum, the tungsten content is 13.00–18.00% by weight. With no tungsten, the molybdenum content is 6.50–9.00% by weight.

The percentage of elements in the alloy steels of the invention have one other qualification, i.e., the sum of the weight percentages of chromium and silicon should be in the range of 9.00–14.00%. To illustrate, where no silicon is present, the chromium content should be 9.00–14.00%. With 3.00% silicon, the chromium content is best kept in the range of about 6–10%. This interrelationship of silicon and chromium gives a corrosion-resistant, oxidation-resistant and forgeable alloy.

The balance of the alloy steels of this invention is substantially all iron together with such alloy impurities as are sometimes found in alloy steels.

Specific examples of alloy steel compositions of this invention appear in the following table wherein the balance of the alloy steels is substantially all iron in each instance.

TABLE I

Percent by Weight

| Example | C | Si | Mn | S | P | W | Mo | Cr | V | Co |
|---|---|---|---|---|---|---|---|---|---|---|
| 1 | 1.26 | 2.63 | 0.30 | .020 | .024 | 5.47 | 4.75 | 8.12 | 4.20 | |
| 2 | 1.26 | .34 | 0.27 | .020 | .024 | 5.53 | 4.68 | 12.53 | 4.12 | |
| 3 | 1.25 | 2.54 | .28 | .019 | .010 | 5.59 | 4.25 | 7.72 | 4.00 | 4.75 |
| 4 | 1.25 | 2.63 | 0.54 | .017 | .012 | 5.71 | 4.27 | 8.14 | 4.04 | |

The alloy steels of this invention may be used to produce any type of anti-friction bearing. Illustrative embodiments of bearings made in accordance with the invention are illustrated in the drawing wherein.

Figure 1:
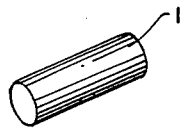
FIG. 1 is a perspective view of a cylindrical roller bearing.
Figure 2:
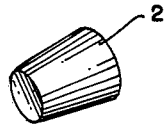
FIG. 2 is a perspective view of a tapered roller bearing.
Figure 3:
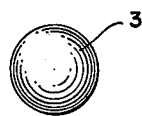
FIG. 3 is a side elevation of a ball bearing.

In accordance with the invention, the alloy steels herein described are used to make any of the rolling bearings of FIGS. 1–3. The cylindrical roller bearings 1, the tapered roller bearings 2 and the ball bearings 3 are solid bodies composed entirely of the alloy steels of this invention.

Figure 4:
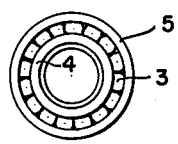
FIG. 4 is a side elevation of the rolling bearings of FIG. 1 mounted between a pair of bearing races.
Figure 5:
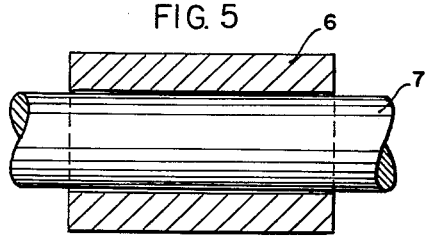
FIG. 5 is a diametric cross-sectional view in side elevation of a journal bearing.

The rolling bearings of FIGS. 1–3 are used in conjunction with races of any suitable construction. There are many different designs for rolling bearing races. The outer race 5 and the inner race 4 illustrated in FIG. 4 are preferably made of the alloy steels of this invention. However, they may be made of other alloy steels or other metals, if desired or expedient. This assembly forms a rotatable, anti-friction connection between two rotating parts connected with the inner and outer races in any manner well-known in the art. In some instances, the races may be formed by opposing grooves in the two rotating parts themselves.

The journal bearings may also take many forms. They consist of a journal 6 having a cylindrical passage in which is rotatably mounted a cylindrical shaft 7. At least one, and preferably both, of the bearing surfaces on said shaft 7 and said journal 6 are made of the alloy steels of this invention.

Figure 6:
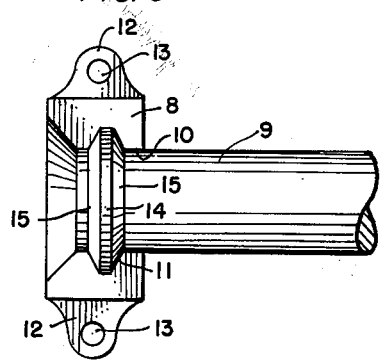
FIG. 6 is a side elevation of one-half of a thrust bearing with the rotating shaft mounted therein.

Thrust bearings serve the function of preventing axial movement in one or both directions for a rotating shaft. The embodiment shown in FIG. 6 is a thrust bearing which resists axial movement in both directions. Like the other bearings, thrust bearings contemplated by this invention may be of any suitable design. In the embodiment illustrated, the thrust bearing designated generally by the numeral 8 rotatably journals a cylindrical shaft 9 in a generally cylindrical hole 10 in the body of the thrust bearing 8. Axial movement of the shaft 9 is precluded by providing an annular, cylindrical groove 11 about the cylindrical wall of the cylindrical hole 10. The annular groove 11 is of a size slightly larger than and of a shape substantially corresponding to the shape of a raised portion on the end of the rotating shaft 9, which raised portion consists of tapered walls 15 terminating in a cylindrical, peripheral wall 14. The thrust bearing 8 is made of two halves, the other half corresponding to the one shown in FIG. 6. The two halves, after placement of the shaft in the bearing, are held together by bolts (not shown) extending through holes 13 in ears 12 on each half. The bearing surfaces of the thrust bearing and preferably also the bearing surfaces of the shaft, are made from the alloy steels of this invention.

Figure 7:
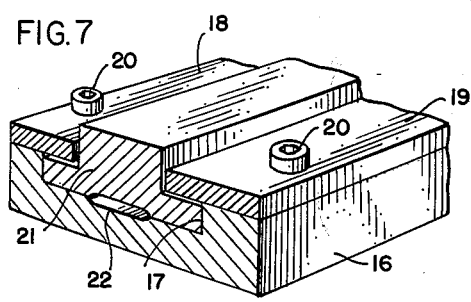
FIG. 7 is a perspective view of a guide bearing.

The guide bearing of FIG. 7 is a bearing made to guide the linear travel of a part, such as a reciprocating member in a machine. In the embodiment illustrated in FIG. 7, the guide bearing consists of a rectangular base 16 having a rectangular groove 17 extending the length thereof. A pair of plates 18 and 19 of a length substantially coextensive with the length of the base 16 is mounted by threaded bolts 20 along each side of the base 16. The base 16 and the plates 19 form a T-shaped groove in which is slidably mounted a T-shaped reciprocating member 21. The base 16 and the reciprocating member 21 are grooved along the length thereof to form an oiling passage or reservoir 22 to lubricate the sliding surfaces. At least one and preferably both of the contacting, bearing surfaces of the reciprocating member and the stationary member are made of the alloy steels of this invention.

The component parts of the bearings illustrated in the drawing have unitary pieces made from one metal. In large bearings, particularly, the main structure of bearings may be made of less wear-resistant and/or less corrosion-resistant metals with the bearing surfaces being made of the alloy steels of this invention in the form of sleeves or inserts mounted in the main bearing structure.

The heat-treatment of the alloy steels of this invention includes the steps of austenitizing at a temperature in the range of about 2150° F. to about 2250° F. for at least 30 seconds and quenching in warm oil or in salt at 300–375° F. The quenched alloys preferably are then tempered at about 1000° F. to 1200° F.

The effects on as-quenched and tempered hardnesses of various austenitizing temperatures is shown in the following examples where the alloy steels tested are those of Examples 1 and 2.

EXAMPLE 5

The alloy steel of Example 1 having the following analysis:

| | Percent |
|---|---|
| Carbon | 1.26 |
| Silicon | 2.63 |
| Manganese | 0.30 |
| Sulfur | 0.020 |
| Phosphorus | 0.024 |
| Tungsten | 5.47 |
| Chromium | 8.12 |
| Vanadium | 4.20 |
| Molybdenum | 4.75 | was cast as an ingot, forged at 2050° F., and rolled at 2100° F. to ¾" diameter. After a regular high speed anneal at 1650° F., the average annealed hardness was 28.3 Rockwell "C" (equivalent to about 269 BHN).

Two specimens each were simultaneously austenitized in a gas-fired, semi-muffle furnace for 30 seconds at temperatures of 2150° F., 2200° F., 2225° F. and 2250° F. and oil quenched. 0.40" was ground from the surface of one set for hardness testing and metallographic examination. The as-quenched hardness as well as the intercept grain size of the oil quenched specimens at the various austenitizing temperatures are tabulated in Table II.

The second set of as-quenched speciments were triple tempered for two hours in each temper stage to ascertain the effect of austenitizing temperature on tempered hardness. Hardness readings, with .015" surface removed, were taken after each of the three tempering cycles. The tempered hardness also is recorded in Table II.

TABLE II

*Effect of Austenitizing Temperature on As-Quenched Hardness and Temered Hardness*

[Specimens oil quenched after 30 seconds at the indicated austenitizing temperature and triple tempered (2+2+2 hours) at 1000° F. Rockwell "C" hardness averaged from 5 readings]

| Austenitize Temperature, ° F. | Gr. Size | As Quenched | First Temper | Second Temper | Third Temper |
|---|---|---|---|---|---|
| 2,150 | 15.0 | 63.2 | 62.6 | 62.2 | 61.7 |
| 2,200 | 15.7 | 62.2 | 63.4 | 63.2 | 62.3 |
| 2,225 | 13.0 | 61.4 | 63.5 | 64.0 | 62.8 |
| 2,250 | 11.7 | 61.1 | 62.3 | 61.6 | 61.6 |

EXAMPLE 6

The alloy steel of Example 2, having the following analysis:

| | Percent |
|---|---|
| Carbon | 1.26 |
| Silicon | .34 |
| Manganese | .27 |
| Sulfur | .020 |
| Phosphorus | .024 |
| Tungsten | 5.53 |
| Chromium | 12.53 |
| Vanadium | 4.12 |
| Molybdenum | 4.68 | was cast as an ingot, forged at 2050° F. and rolled at 2100° F. to ¾" diameter. With a regular high speed anneal at 1650° F., the average annealed hardness was Rockwell "C" 23.2 (equivalent to about 245 BHN).

Two specimens each were simultaneously austenitized in a gas-fired, semi-muffle furnace for 30 seconds at temperatures of 2150, 2200, 2225 and 2250° F. and oil quenched. 0.040" was ground from surface of one set prior to hardness testing and metallographic examination. The as-quenched hardness as well as the intercept grain size of the oil quenched specimens at the various austenitizing temperatures employed are tabulated in Table III.

The second set of as-quenched specimens were triple tempered for two hours in each temper stage at 1000° F. to study the effect of austenitizing temperature on tempered hardness. Hardness readings, with .015" surface removed by grinding, were taken after each of the three tempering cycles. The tempered hardness also is recorded in Table III.

TABLE III

*Effect of Austenitizing Temperature on As-Quenched Hardness and Tempered Hardness*

[Specimens oil quenched after 30 seconds at the austenitizing temperature and triple tempered (2+2+2 hours) at 1000° F. Rockwell "C" hardness averaged from 5 readings].

| Austenitizing Temperature, °F. | As Quenched | First Temper | Second Temper | Third Temper | Grain Size |
|---|---|---|---|---|---|
| 2,150 | 59.2 | 60.9 | 59.8 | 59.5 | 10.3 |
| 2,200 | 53.4 | 61.5 | 63.4 | 63.5 | 10.7 |
| 2,225 | 48.2 | 58.4 | 62.5 | 63.4 | 10.3 |
| 2,250 | 50.2 | 59.3 | 63.2 | 63.8 | 7.5 |

Both alloys had very high hardenability. The alloy steel of Example 1 was moderately fine grained and resists appreciable grain coarsening with increasing hardening temperature. Its graining was better than the alloy steel of Example 2, which had a moderately coarse graining. Both alloy steels showed good oxidation resistance.

The properties of the alloy steels of this invention make them especially suitable as wear-resistant, heat resistant metals for the bearing surfaces of anti-friction bearings which are used on machines or apparatus in which the bearings are subjected in use to very high temperatures. The bearings made from the alloy steels herein described have good resistance to oxidation and wear at high temperatures and have a long operating life under these conditions.

The invention is hereby claimed as follows:

1. An anti-friction bearing having two bearing surfaces movable with respect to each other with at least one of said bearing surfaces being made of an alloy steel of the composition comprising carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50% with the remainder being substantially all iron, the sum of the percentages of chromium and silicon being 9.00–14.00%.

2. A rolling bearing made of an alloy steel of the composition comprising carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50% with the remainder being substantially all iron, the sum of the percentages of chromium and silicon being 9.00–14.00%.

3. A journal bearing having a circular bearing surface adapted to journal a rotatable shaft, said surface being made of an alloy steel of the composition comprising carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50%; with the remainder being substantially all iron, the sum of the percentages of chromium and silicon being 9.00–14.00%.

4. A guide bearing comprising a linearly movable slide and a member having a guide opening in which said slide member is mounted, the contacting surfaces of at least one of said slide and said guide being made of an alloy steel of the composition comprising carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50%; with the remainder being substantially all iron, the sum of the percentages of chromium and silicon being 9.00–14.00%.

5. A thrust bearing having bearing surfaces adapted to rotatably receive a rotatable shaft, said bearing surfaces including means to preclude linear motion of said shaft with respect to said bearing in at least one direction, said bearing surfaces being made of an alloy steel of the composition comprising carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50% with the remainder being substantially all iron, the sum of the percentages of chromium and silicon being 9.00–14.00%.

6. In an alloy steel which is corrosion resistant, oxidation resistant, forgeable, and suitable for use in making bearings capable of operating at temperatures of at least 500° F., the combination of: carbon, 1.00–1.40%; silicon, 0–3.00%; manganese, 0–1.00%; tungsten plus molybdenum times two, 13.00–18.00%; chromium, 6.00–14.00%; vanadium, 3.00–5.00%; cobalt, 0–10.00%; sulfur, 0–0.50%; and phosphorus, 0–0.50% with the remainder being substantially all iron, the sum of the percentages of chromium and silicon being 9.00–14.00%.

References Cited in the file of this patent

UNITED STATES PATENTS 2,147,121   Emmons _____ Feb. 14, 1939